United States Patent [19]

Snow, Jr.

[11] 3,886,108

[45] May 27, 1975

[54] PREPARATION OF FLUOROELASTOMER LATEX WITH MIXTURE OF MONO- AND DI-ESTERS OF PHOSPHORIC ACID

[75] Inventor: Austin Matthew Snow, Jr., Wilmington, Del.

[73] Assignee: E. I. du Pont de Nemours and Company, Wilmington, Del.

[22] Filed: Nov. 14, 1973

[21] Appl. No.: 415,666

[52] U.S. Cl. .................. 260/29.6 F; 260/29.6 MP; 260/29.6 PT; 260/80.77
[51] Int. Cl. ............................................. C08f 45/24
[58] Field of Search.. 260/29.6 F, 29.6 MP, 29.6 PT

[56] References Cited
UNITED STATES PATENTS

| | | | |
|---|---|---|---|
| 2,559,749 | 7/1951 | Benning | 260/29.6 F |
| 2,878,196 | 3/1959 | Buffington | 260/29.6 PT |
| 3,366,584 | 1/1968 | Zimmerman | 260/29.6 MP |

Primary Examiner—Harold D. Anderson

[57] ABSTRACT

A fluoroelastomer latex having beneficial utility for the manufacture of fluoroelastomer films can be prepared by (A) forming a solution in a volatile organic solvent of a vinylidene fluoride copolymer elastomer which has been isolated from an emulsion made by an aqueous emulsion copolymerization reaction, (B) mixing the copolymer solution with an aqueous solution of a particular anionic surfactant to form an aqueous dispersion of the copolymer, said surfactant being a specified mixture of mono and di esters of phosphoric acid with nonylphenoxypolyethyleneoxyglycol having an average molecular weight of about 4,000–6,000, (C) subjecting the resulting dispersion to distillation to remove the organic solvent, (D) creaming the resulting latex and (E) separating the creamed latex.

5 Claims, No Drawings

PREPARATION OF FLUOROELASTOMER LATEX WITH MIXTURE OF MONO- AND DI-ESTERS OF PHOSPHORIC ACID

BACKGROUND OF THE INVENTION

This invention relates to a fluoroelastomer latex and a process for preparing it.

The industries which manufacture and use fluoroelastomer latex compositions have needed a process for preparing such compositions that is capable of yielding a product having improved utility for the production of fluoroelastomer films, coatings, composite sheet materials and the like. For example, there has been a need for a process that results in a fluoroelastomer latex which can be applied to a substrate and dried to form a high quality fluoroelastomer film.

SUMMARY OF THE INVENTION

The present invention provides a process for preparing a fluorelastomer latex which comprises:

A. providing a solution in a volatile water-immiscible organic solvent of an elastomeric copolymer of vinylidene fluoride and at least one other fluorine-containing monomer,
B. forming an aqueous dispersion of said copolymer by mixing under vigorous agitation the solution of step A with an aqueous solution of an anionic surfactant which is a mixture of mono and di esters of phosphoric acid with nonylphenoxypolyethyleneoxyglycol, the weight ratio of monoester to diester in said mixture being about 40:60 to 60:40 and said mixture having an average molecular weight of about 4,000–6,000,
C. removing the organic solvent from the resulting aqueous dispersion by distillation,
D. creaming the resulting solvent-free latex to form a creamed latex, and
E. separating the creamed latex obtained in Step D.

The invention also provides a novel fluoroelastomer latex which is an aqueous dispersion of an elastomeric copolymer of vinylidene fluoride and at least one other fluorine-containing monomer, said dispersion containing an anionic surfactant as described in the previous paragraph, said dispersion being substantially free of low molecular weight fluorine-containing polymers terminated with ionizable functional groups.

DESCRIPTION OF PREFERRED EMBODIMENTS

In reference to the vinylidene fluoride copolymer of the present fluoroelastomer latex, the "other fluorine-containing monomer" is usually an ethylenically unsaturated monomer containing at least one fluorine atom substituent on each double-bonded carbon atom. The copolymer is preferably composed of at least one of the following: copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, a perfluoroalkyl perfluorovinyl ether and tetrafluoroethylene.

Copolymers of vinylidene fluoride and hexafluoropropylene are described in U.S. Pat. No. 3,051,677 issued to Rexford. Copolymers of vinylidene fluoride, tetrafluoroethylene and hexafluoropropylene are described in U.S. Pat. No. 2,968,649 issued to Pailthorp and Schroeder. Copolymers of vinylidene fluoride and pentafluoropropylene are described in U.S. Pat. No. 3,331,823 issued to Sianesi et al.; and copolymers of these two components with tetrafluoroethylene are described in U.S. Pat. No. 3,335,106 issued to Sianesi et al. Copolymers of vinylidene fluoride, a perfluoroalkyl perfluorovinyl ether (having 1-5 carbon atoms in the alkyl group) and tetrafluoroethylene are described in U.S. Pat. No. 3,235,537 issued to Albin and Gallagher.

In the specially preferred embodiments of the invention, the vinylidene fluoride copolymer (fluoroelastomer) of the latex is the product of copolymerizing about 30–80 mole percent of vinylidene fluoride, about 15–40 mole percent of hexafluoropropylene and about 5–30 mole percent of tetrafluoroethylene (based on the total moles of the three monomers) in an aqueous emulsion containing an inorganic peroxide catalyst.

The latex preferably has a fluoroelastomer content of about 40–75 percent by weight. Especially preferred is a latex whose fluorelastomer content is about 55–70 percent by weight.

It is necessary that the latex contain an anionic surfactant which is a mixture of mono and di esters of phosphoric acid with nonylphenoxypolyethyleneoxyglycol, the weight ratio of the mono to di ester in said mixture being about 40:60 to 60:40 and said mixture having an average molecular weight of about 4,000–6,000. The mono ester/di ester weight ratio is preferably about 45:55 to 55:45. The mono ester can be represented by the formula

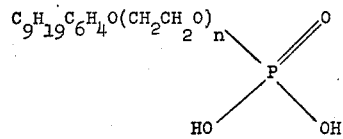

and the diester can be represented by the formula

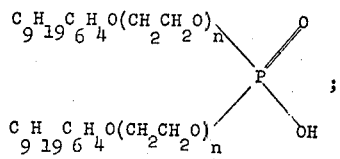

$n$ being 5–15.

It is preferred in the majority of applications that said anionic surfactant be present in the latex in an amount equal to about 3–10 parts by weight for each 100 parts by weight of the fluoroelastomer. Particularly preferred is an anionic surfactant content of about 4–5 parts per 100 parts of the fluoroelastomer. It is also sometimes preferred that the latex contains a small amount of a nonionic surfactant, for example about 0.1–5 percent based on the weight of said anionic surfactant. A preferred nonionic surfactant is nonylphenoxypolyethyleneoxyglycol, the molecular weight of which is preferably about 4,000–6,000.

The preferred pH of the latex is usually about 3–7, with special preference for a pH of about 5–6. In a typical composition, one will find that less of the required surfactant is needed when the pH of the latex is 6 than when the pH is 3 in order to get good results.

The present latex can also contain 1 or more additives known to be useful in fluoroelastomer latex compositions, for example fillers, coloring agents and curing agents.

In carrying out the process of this invention, one must provide a solution of the fluoroelastomer (vinylidene fluoride copolymer) in a volatile water-immiscible organic solvent (step A as set forth above). The solvent is "volatile" in the sense that it is capable of being distilled off in step C at a temperature below the boiling point of water in the presence of water. The solution provided in step A preferably has a fluoroelastomer content of about 5–20 percent by weight. One skilled in the art will have no difficulty in selecting a fluoroelastomer content for a particular composition which is not so low as to require undue time and expense in removing the solvent and is not so high as to render the solution unduly viscous and difficult to process.

The solution of step A is preferably prepared by a process which comprises forming the copolymer by aqueous emulsion copolymerization (e.g., in the presence of an inorganic peroxide catalyst), isolating the copolymer from the resulting aqueous emulsion, and dissolving the copolymer in a volatile organic solvent. As illustrated below in step 2 of Example 1, a useful isolation process comprises the steps of coagulating, washing and drying the copolymer. The aqueous emulsion from which the copolymer is isolated contains a contaminant composed of one or more low molecular weight fluorine-containing polymers (e.g., polymers made up of about 3–15 monomer units) terminated with ionizable functional groups (e.g., sodium sulfonate, sodium sulfate, sodium carboxylate and/or equivalents thereof), and the latex of step D, both before and after creaming, is substantially free of said contaminant. Thus, the latex product contains none or practically none of said contaminant. Fluoroelastomer latex compositions of the type provided by the prior art, which are not completely or almost completely free of such contaminants (e.g., which contain more than mere traces thereof), are not useful for the manufacture of fluoroelastomer films by ordinary film-casting and drying procedures when film products are required which are completely or almost completely free (substantially free) of mud cracks.

In step B of the process, one mixes the solution provided in step A with an aqueous solution of the required surfactant under vigorous agitation to form an aqueous dispersion of the fluoroelastomer. The surfactant is preferably used in step B in an amount such that the resulting aqueous dispersion contains about 3–10 parts of said surfactant for each 100 parts by weight of the elastomeric copolymer.

In the majority of applications, the weight ratio of the fluoroelastomer solution to the surfactant solution used in step B will be about 50:50 to 70:30. It will be apparent that the best ratio for a particular application will depend on such factors as the viscosity and fluoroelastomer content of the fluoroelastomer solution, the efficiency of the mixer being used to form the dispersion and the concentration of the surfactant solution.

In step C, one removes the organic solvent from the aqueous dispersion by distillation. It is preferred to carry out the distillation under a subatmospheric pressure so that lower temperatures can be used, thereby reducing the danger of coagulating the dispersion.

In step D, one creams the solvent-free latex obtained in step C to form a creamed latex. It is known in the art that one can mix ammonium alginate or other suitable creaming agent with a polymer latex to produce a latex having a relatively high polymer content (creamed latex). In most cases, it will be preferred to employ sufficient creaming agent in step D so that the creamed latex has a fluoroelastomer content of about 40–75 percent by weight. The creaming procedure described by Buffington in U.S. Pat. No. 2,878,196 can be used to carry out step D. It is usually preferred to mix with the latex about 0.1–3 grams of creaming agent for each 100 grams of fluoroelastomer present in the latex, then the mixture is allowed to stand until the desired degree of creaming has taken place. At the end of step D, the lower liquid phase is a concentrated dispersion of polymer (creamed latex), and the upper liquid phase is a serum containing water and various contaminants including the above-mentioned low molecular weight polymers terminated with ionizable functional groups.

In step E, one separates or isolates the creamed latex formed in step D. This can be done by methods known to be useful for separating one liquid phase from another, for example by decantation.

Fluoroelastomer latex compositions can be prepared in accordance with the present invention which have beneficial utility in the manufacture of fluoroelastomer films and composite sheet materials containing fibers and a fluoroelastomer binder. The present latex is surprisingly useful for the manufacture of fluoroelastomer films and coatings by ordinary film-casting and drying procedures for use in applications where the dried fluoroelastomer layer must be free of cracks. Latex compositions are also obtainable by the present process which are free of the highly toxic perfluorinated surfactants which are present in many prior art fluoroelastomer latex materials. The present latex is also very useful as a binder for heat-resistant fibers (e.g., asbestos, glass or polyimide fibers) in the manufacture of resilient, heat-resistant gaskets and insulation products.

EXAMPLE 1

This example, and the ones that follow, illustrate the invention; all amounts are by weight unless otherwise indicated.

A fluoroelastomer latex composition of the present invention is prepared by 1. making an aqueous emulsion of a fluoroelastomer which contains 45 percent of vinylidene fluoride (polymerized units), 30 percent of hexafluoropropylene and 25 percent of tetrafluoroethylene by copolymerizing the monomers in an aqueous emulsion containing ammonium persulfate and sodium bisulfite in the manner described in Example 6 of the above-mentioned U.S. Pat. No. 2,968,649 except for the obvious slight difference in the proportion of monomers used, the resulting copolymer emulsion having a fluoroelastomer content of 20 percent and also containing as contaminants low molecular weight fluorine-containing polymers (made up of 3–15 monomer units) which are terminated with ionizable functional groups including sodium sulfate, sodium carboxylate and sodium sulfonate;

2. isolating the fluoroelastomer from the resulting emulsion by coagulating the fluoroelastomer and washing and drying the resulting fluoroelastomer crumb in the manner taught in the Example of Bailor and Cooper, U.S. Pat. No. 3,536,683;

3. making 1200 ml. of a fluoroelastomer solution having a fluoroelastomer content of 10 percent by dissolving dried fluoroelastomer obtained in the manner described in steps (1) and (2) in ethylacetate;

4. making a surfactant solution by dissolving in 800 ml. of distilled water 4.8 grams of an anionic surfactant which is a mixture of mono and di esters of phosphoric acid with nonylphenoxypolyethyleneoxyglycol, the weight ratio of mono ester to di ester in said mixture being about 50:50 and said mixture having an average molecular weight of about 5,000;

s. adding to the resulting surfactant solution enough of a 10 percent aqueous sodium hydroxide solution to raise the pH to 6.0;

6. making an aqueous fluoroelastomer dispersion by gradually adding (with stirring) the fluoroelastomer solution obtained in step (3) to the surfactant solution obtained in step (5) and subjecting the resulting mixture to vigorous agitation for 10 minutes in a high-speed turbine-stator type of high-shear homogenizer-mixer ("Eppenbach Homo-Mixer");

7. rapidly removing the ethyl acetate from the resulting aqueous dispersion by means of a rotating evaporator type of distillation apparatus (Flash Evaporator from Buchler Instruments) operating at subatmospheric pressure (80 mm. of Hg) with a water temperature of 60°C;

8. after allowing the resulting solvent-free latex to cool to 22°C., adjusting its pH to 6.0 by adding 10 percent aqueous sodium hydroxide solution;

9. creaming the resulting latex by mixing therewith 20 parts of a 1 percent aqueous solution of ammonium alginate (creaming agent) for each 100 parts of the latex, and then allowing the mixture to stand for 16 hours at 22°C.; and 10. separating the creamed latex by decanting off the upper serum layer and pouring the creamed latex through a cheesecloth filter.

The latex product obtained in step (10) has a fluoroelastomer content of 63.1 percent and a Brookfield viscosity of 136 cps. (No. 4 spindle at 50 rpm). The latex is substantially free of the low molecular weight polymer contaminant mentioned in step (1); this contaminant is a toxic fluorinated surfactant. After several weeks of storage at 22°C., the latex is still useful. For some applications, it will be desirable to add to this latex a curing agent, filler or coloring agent known to be useful in fluoroelastomer latex compositions.

The latex product of Example 1 has the utility described in the paragraph which precedes Example 1.

When a 1.2 mm. thick fluoroelastomer film is made by casting a layer of the Example 1 latex and drying it, the film is free of cracks. The Example 1 latex can be used in the manufacture of high quality fluoroelastomer reinforced asbestos sheet material having good strength, elongation and fluid resistance properties by forming a 4 percent aqueous slurry of asbestos fibers containing a small amount of a suitable surfactant, mixing the latex (with or without dilution) with the asbestos slurry, reducing the pH of the mixture to 4.5 with aqueous alum solution, forming the mixture into sheets in a manner known to be useful for preparing asbestos sheets, and drying the resulting sheets in a drum-dryer and pressing them to the desired thickness. In a typical application, enough of the latex is used so that the product contains 20 parts of the fluoroelastomer for each 100 parts of asbestos.

When a latex is prepared by repeating step (1) of Example 1, followed by adjusting the latex pH to 6.0 and using the procedure of steps (9) and (10) of Example 1 to form a creamed latex whose fluoroelastomer content is 63.1 percent, the resulting latex has little or no utility for the manufacture of fluoroelastomer films and coatings by ordinary film-casting and drying procedures in applications where the dried fluoroelastomer layer must be substantially free of cracks.

When Example 1 is repeated except the surfactant used in step (4) is replaced individually with 40 other types of surfactant known to be useful in polymer latex compositions, the results are far inferior because of: failure to obtain a useful fluoroelastomer dispersion in step (6), coagulation of the fluoroelastomer during step (7), unduly rapid coagulation of the latex obtained in step (10) during storage, and/or films made from the latex contain numerous mud cracks.

EXAMPLE 2

Another fluoroelastomer latex which has the utility described in the paragraph prior to Example 1 is prepared by repeating Example 1 except step (1) comprises making an aqueous emulsion of a fluoroelastomer composed of 60 percent vinylidene fluoride and 40 percent hexafluoropropylene (polymerized units) by copolymerizing the monomers in an aqueous emulsion containing ammonium persulfate and $K_2HPO_4$ in the manner described in Nyce's U.S. Pat. No. 3,723,387, Example 2A, steps 1–4; the resulting copolymer emulsion having a fluoroelastomer content of 20 percent and also containing as contaminants low molecular weight fluorine-containing polymers (made up of 3–15 monomer units) which are terminated with ionizable functional groups including potassium sulfate and potassium carboxylate.

EXAMPLE 3

Another very useful latex of the present invention is prepared by repeating Example 1 except in step (4) one dissolves in the water 4.66 grams of said anionic surfactant and 0.14 gram of a nonionic surfactant which is nonylphenoxypolyethyleneoxyglycol having an average molecular weight of about 5,000.

I claim.

1. A process for preparing a fluoroelastomer latex which comprises:
    A. providing a solution in a volatile water-immiscible inert organic solvent of an elastomeric copolymer of vinylidene fluoride and at least one other ethylenically unsaturated fluorine-containing monomer,
    B. forming an aqueous dispersion of said copolymer by mixing under vigorous agitation the solution of step A with an aqueous solution of an anionic surfactant which is a mixture of mono and di esters of phosphoric acid with nonylphenoxypolyethyleneoxyglycol, the weight ratio of monoester to diester in said mixture being about 40:60 to 60:40 and said mixture having an average molecular weight of about 4,000–6,000,
    C. removing the organic solvent from the resulting aqueous dispersion by distillation,
    D. creaming the resulting solvent-free latex to form a creamed latex, and
    E. separating the creamed latex obtained in step D.

2. A process according to claim 1 wherein the creaming of step D is sufficient to form a creamed latex whose copolymer content is about 40–75 percent by weight.

3. A process according to claim 2 wherein the solution of step A is prepared by forming the copolymer by aqueous emulsion copolymerization, isolating the copolymer from the resulting aqueous emulsion, and dissolving the copolymer in a volatile organic solvent; said aqueous emulsion containing a contaminant composed of one or more low molecular weight fluorine-containing polymers terminated with ionizable functional groups, and the latex of step D being substantially free of said contaminant.

4. A process according to claim 3 wherein said anionic surfactant is used in step B in an amount such that the resulting aqueous dispersion contains about 3–10 parts of said surfactant for each 100 parts by weight of the elastomeric copolymer.

5. A process according to claim 3 wherein the solution of step A has a copolymer content of about 5–20 percent by weight.

* * * * *